J. R. GAMMETER.
FABRIC FOR MAKING TIRES.
APPLICATION FILED FEB. 7, 1914.
1,166,669.
Patented Jan. 4, 1916.
2 SHEETS—SHEET 1.
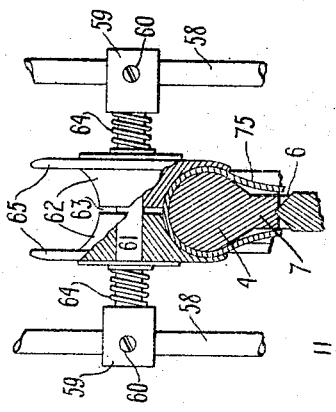
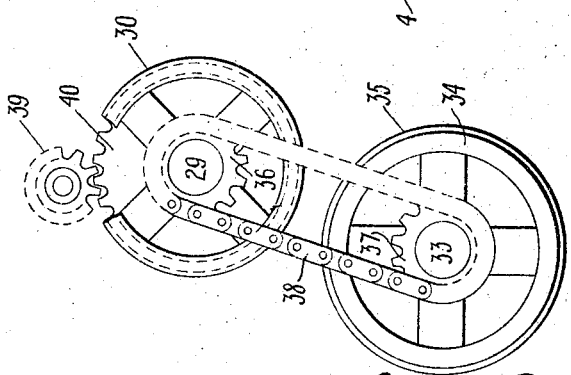
Witnesses:
J. Hilary Bouillon
Gerald E. Terwilliger
John R. Gammeter Inventor
By his Attorney
Seward Davis

J. R. GAMMETER.
FABRIC FOR MAKING TIRES.
APPLICATION FILED FEB. 7, 1914.

1,166,669.

Patented Jan. 4, 1916.
2 SHEETS—SHEET 2.

Witnesses:
J. Hilary Bouillon
Gerald E. Terwilliger

John R. Gammeter Inventor
By his Attorney
Seward Davis

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

FABRIC FOR MAKING TIRES.

1,166,669.  Specification of Letters Patent.  Patented Jan. 4, 1916.

Original application filed December 2, 1909, Serial No. 531,045. Divided and this application filed February 7, 1914. Serial No. 817,219.

*To all whom it may concern:*

Be it known that I, JOHN R. GAMMETER, a citizen of the United States, residing at Akron, county of Summit, and State of Ohio, have invented certain new and useful Improvements in Fabric for Making Tires, of which the following is a specification.

My invention relates to the making of tires composed of fabric and rubber, and more particularly to the making of the outer casings or shoes of pneumatic tires. Tires of this nature, designed for use on motor vehicles, commonly comprise a main body portion composed of a number of layers of fabric laid one upon another and held together with a suitable binder, usually of rubber gum with which the fabric is impregnated, beads secured to the inner edges of the body portion for securing the tire to the rim, and an outer tread surface of soft rubber. This application is a division of my application Serial Number 531,045, filed December 2, 1909, relates broadly to a flexible band for use in forming tires comprising a strip of tire-making material and an auxiliary piece or pieces of fabric attached thereto at either the leading or the following end or both, for insuring the same degree of stretch in these end portions as in the remainder of the strip of tire-making material. This auxiliary piece of fabric I term a "leader," although it may also serve a useful purpose as a "follower," and if used at the rear end of the strip of tire-making material and not serving as a connector to a subsequent strip, that would be its only purpose.

My invention further relates to a construction in which the fabric used for forming the body portion of the tire is supplied in rolls comprising a series of strips of gummed bias fabric each of a length sufficient to make one tire, the strips being joined by auxiliary pieces of fabric styled "leaders."

Figure 4:
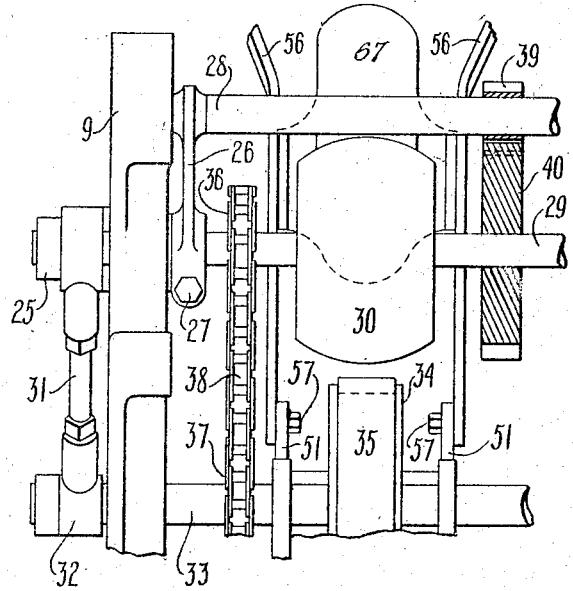
Figure 5:
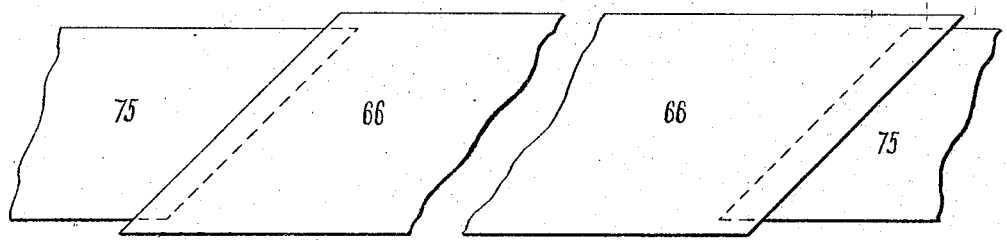

In the accompanying drawings which form a part of this specification, Figure 1 is a side elevation of a tire-making machine and fabric embodying my invention; Fig. 2 is a fragmentary side elevation showing the fabric feeding rolls and driving mechanism therefor; Fig. 3 is a detail view partly in section showing the construction of a supporting and guiding roll and its associated parts; Fig. 4 is an end view of the driving mechanism shown in Fig. 2; Fig. 5 is a diagrammatic view showing the method of joining the ends of the strips of fabric for making two tires by means of a leader.

Referring to the drawings in detail the numeral 1 designates a bed plate upon which is mounted a pair of uprights 2 carrying the main shaft 3, the forward end of which projects in front of the uprights. Upon the overhanging end of this shaft I provide means for supporting the core or ring 4 about which the tire is to be formed. The means employed for this purpose preferably comprises a chuck 5 having three outwardly projecting arms 6 with V-shaped extremities adapted to engage within a V-shaped groove cut in the inner face of the inwardly projecting flange 7 of the core. The chuck may be of any usual or well known construction and may resemble the chucks commonly used for holding work upon turning lathes, in which, by the use of a suitable key or wrench engaging a nut, appropriate mechanism within the chuck may be operated to expand or retract simultaneously all of the arms 6. By this means the proper centering of the core or ring 4 is insured.

For driving the shaft 3 and rotating the chuck and ring carried thereby, any suitable mechanism may be employed.

Fixed upon one end of the bed plate is a base 8 upon which is mounted an upright 9 provided with bearing recesses 10 and 11. The upright is preferably mounted to slide on the base toward or away from the tire-carrying ring 4. A screw 12 operated by hand wheel 13 and working in a nut 14 carried by the upright provides means for adjusting the position of the latter.

In the bearing 10 is mounted the shaft 15 of a reel 16 carrying a roll 17 of the fabric from which the body of the tire is to be formed, the gummed tire-forming fabric being laid upon and rolled up with a strip of ungummed fabric or "liner," which prevents the layers of gummed fabric from adhering to each other. To prevent the too ready rotation of this reel, the shaft 15 is preferably provided with a brake disk 18 against which bears a brake shoe 19 mounted at one end of an arm 20 pivoted on a pin 21. On the other end of the arm 20 slides a weight 22 which may be secured in any desired position by a set screw 23 to produce the proper braking effect. In the upper bearing recess 11, which is preferably of considerable depth, is mounted a reel 24 which is driven through friction from the roll 17 and upon which is wound the ungummed strip or liner coming from the roll. As the roll 17 is unwound, the liner being taken up by the reel 24 will increase the diameter of the latter, the deep bearing recesses 11 permitting the shaft of the reel to rise correspondingly. Also mounted on the upright 9 is a pair of longitudinally alined sleeves 25, one being carried by each of the side members of the upright and each projecting at each side of its side member to form a pair of cylindrical bosses. To the two bosses thus formed projecting from the inner sides of the side members of the upright 9 is secured a pair of upwardly extending arms 26. These arms are secured to the bosses against rotation in any suitable manner, as by having their lower ends split and drawn together by clamping bolts 27. Rotatably mounted in these arms is a roller 28, and journaled in the sleeves 25 is a shaft 29, to which is fixed a convex or bellied roller 30. On the bosses formed by the outwardly projecting portions of the sleeves 25 is pivoted a pair of depending arms 31, secured to the lower ends of which are boxes 32 carrying a shaft 33. To this shaft 33 is fixed a driving wheel 34 preferably provided with a rubber tire 35, or other suitable friction surface adapted to bear against the core or ring 4 or the fabric wound thereon and to receive motion from the latter. Means are also provided for driving the shaft 29 and the roller 30 from the shaft 33, these means being shown in this case as a pair of sprocket wheels 36 and 37 connected by a chain 38. Gears 39 and 40 are also preferably provided for driving the roller 28 from the shaft 29. It is obvious that any other form of driving connections may be used in place of those described. For holding the wheel 34 in driving contact with the ring 4, or partially formed tire, I provide a frame 41 pivoted at one end to the shaft 33 and having projecting from the other end thereof a shaft 42, the free end of which slides in a box 43 pivoted between the arms of a forked lever 44 fixed to a shaft 45 journaled in the upright 9. To the projecting end of this shaft is secured a hand lever 46 having a pawl 47 engaging with a fixed notched segment 48. A spring 49 is pressed between the box 43 and the hub of a hand wheel 50 screwing on a threaded portion of the shaft 45 and forces the frame and the driving wheel carried thereby forward, the tension of the spring being regulated by the position of the lever 46. The tension of the spring may also be adjusted by rotating the hand wheel 50. Also supported on the shafts 33 is a pair of arms 51 having slots 52 in their outer ends. The rear ends of said arms are bent upwardly as shown at 53 and provided with slots 54 arranged concentrically with the shaft 33. By means of bolts 55 passing through the slots 54 the arms may be secured to the frame 41 in desired angular position. Secured to these arms 51 is a pair of segmental bars 56, which support the fabric shaping guide or shoe 67 which is preferably secured to these bars by means of bolts 68 passing through slots therein, whereby a limited circumferential adjustment of the guide is permitted. This guide or former preferably consists of a single piece of metal shaped to conform closely to the outer surface of the core and tapered to a comparatively thin edge at its outer end which is brought as close as possible to the surface of the core, or partially formed tire thereon. The outer surface of the guide is made smooth to permit the fabric to slide thereover. The bars 56 are preferably secured to the arms by means of bolts 57 passing through the slots 52, whereby the position of the bars relatively to the arms may be adjusted. From the upper end of each of the bars 56 projects a radial standard 58, upon each of which is mounted a box 59. The boxes are slidably mounted on these radially disposed standards, means such as set screws 60 being provided for securing them in desired position thereon. In the boxes 58 is journaled a transverse shaft 61 upon which is mounted a roller 62 adapted to bear upon a ring 4, or partially formed tire, and to support the free end of the bars 56. This roller 62 is preferably split as at 63, its two halves being urged together by springs 64. It is preferably formed of some yielding material such as soft rubber, in order that it may fit smoothly on the layers of fabric wound upon the core 4, and its extended flanges 65 closely embrace the sides of the partly formed tire.

In the operation of my device a core or ring is inserted in the machine and secured to the chuck. As the arms of the latter always move equally toward and away from the center of rotation of the chuck, the centering of the ring is assured. The split roller now rests on the outer surface of the ring or core and supports the outer ends of the bars 56 in proper position relatively thereto. The driving wheel 34 is held in driving engagement with the ring by the pressure of the spring 49, the tension of which is regulated by the hand lever 46. A reel 16 bearing a roll of fabric 17 is now placed in the bearing recesses. This roll of fabric preferably comprises a series of strips of gummed bias fabric 75, each of a length just sufficient to make one tire, the strips being joined by leaders 66. The latter are preferably also formed of bias fabric of texture similar to the fabric used for forming the tires and are impregnated with rubber and vulcanized. The band of strips of gummed fabric and leaders thus formed is rolled up with a strip of ungummed fabric or liner, as already described. A leader 66 is secured to the free end of the first strip of gummed fabric. In starting the tire this leader is carried over the roller 28 and the convex or bellied roller 30, the end of it being passed over the former 67 and applied to the ring or core 4, to which it is secured by a suitable cement or otherwise. The end of the liner is rolled about the reel 16. After the application of any desired tools, not shown, to cause the fabric to adhere smoothly to the core, power is applied to the main shaft. The driving wheel 34 will now begin to rotate, and will, through the chain 38 and gearing 39 and 40, positively drive the rolls 28 and 30. The diameters of the driving wheel 34 and the roll 30, and of the sprockets 36 and 37, are so proportioned that the peripheral speed of the central portion or crown of the roll 30 is somewhat less than that of the outside of the core or ring, usually about 15 per cent. less. The peripheral speed of the roll 28 is, however, preferably about equal to that of the crown of the roll 30, although I may make it slightly less if desired. The roll 28 is usually provided with a roughened surface, as by covering it with cloth or rubber, in order to prevent slipping between its surface and the fabric passing over it, whereby it will be caused to feed the fabric uniformly to the roll 30. Between the roll 30 and the core the fabric will be stretched, owing to the smaller peripheral speed of the former. The stretching will be greatest in the middle of the strip of the fabric as the peripheral speed of the inner portions of the core to which the edges of the fabric are to be applied is less than that of the outer circumference of the core and usually no greater than that of the roller 30. The leader 66 is used in order to equalize the stretch in the strip of tire forming fabric and to produce the same condition in it at the starting and completing of the tire as exists during the remainder of the formation thereof. After the core has been rotated to such an extent that the end of gummed fabric has been drawn into contact therewith by the leader and has become firmly attached thereto, the leader, which is of such a length as to extend only a part of the way around the core, is removed. The rotation of the core is then continued, and the winding up and laying of the gummed tire forming fabric is begun. The fabric slides over the former or guide 67 and is cupped to the approximate shape of the tire section being laid on the core by the roll 63.

As will be seen, the roller 62 will be lifted slightly by the successive layers of fabric, carrying with it the bars 56. It will also be seen that as the rollers 28 and 30 are driven from the driving wheel 34, which takes its motion from the outer surface of the tire so far as built up, the ratio of the peripheral speed of the outer surface of the partially formed tire to that of the roller 30 will remain constant regardless of the increasing diameter of the former.

The operation of forming the tire by any suitable tools is continued until a sufficient number of layers of fabric have been applied to form the completed body portion of the tire, whereupon the band of fabric coming from the roll is severed. If the strips of fabric forming the roll 17 have been measured off with sufficient exactitude, the junction between the end of a strip and one of the leaders 66 will now have been reached and this severing will merely consist in detaching the end of the leader from the end of the strip of fabric. If too long a strip of fabric has been used, the strip will be actually severed at this point and the surplus length detached from the leader. The roll of fabric, when properly measured out, is thus left in condition for the immediate starting of another tire, the leader being ready for application to a new core which can be put in the machine as soon as the old core with the tire thereon is removed.

While I have illustrated and described only one specific embodiment of my invention, I realize that it is susceptible of wide application and I do not desire to be limited to the precise structure shown and described.

Having thus described my invention, I claim.

1. A flexible band for use in forming tires comprising a series of strips of tire making material and leaders connecting said strips.

2. A flexible band for use in making tires comprising a series of strips of bias tire forming fabric and leaders connecting the adjacent ends of said strips.

3. A flexible band for use in making tires comprising a series of strips of tire forming material and leaders connecting the adjacent ends of said strips, said leaders being formed of material having substantially the same coefficient of elasticity as that of the tire forming material.

4. A band of flexible material for use in making tires comprising a series of strips of bias tire forming fabric and leaders of similar bias fabric connecting the adjacent ends of said strips.

5. A band for use in making tires comprising a series of strips of bias gummed tire forming fabric, and leaders connecting the adjacent ends of said strips, said leaders being made of bias fabric impregnated with a rubber compound and vulcanized.

6. A flexible band for use with a tire making machine, comprising a series of strips of tire forming material, each of a length sufficient to form a complete tire or a definite and predetermined part thereof, and leaders of flexible material connecting the adjacent ends of said strips.

7. A leader for attaching the end of a strip of bias tire fabric to the core of a tire making machine, comprising a strip of bias fabric of less length than the periphery of the core.

8. A leader for attaching the end of a strip of bias tire fabric to the core of a tire making machine, comprising a strip of material of less length than the periphery of the core, said material having substantially the same coefficient of elasticity as that of the tire forming material.

9. A leader for attaching the end of a strip of bias tire fabric to the core of a tire making machine, comprising a strip of bias fabric of less length than the periphery of the core, said fabric being impregnated with a rubber compound and vulcanized.

10. A flexible band for use in forming tires comprising a strip of tire-making material and an auxiliary flexible member detachably connected to one end thereof.

11. A flexible band for use in forming tires comprising a strip of tire-making material, an auxiliary member or leader at one end thereof for joining it to the core or tire forming device, and a second auxiliary member at the other end of said strip.

12. A flexible band for use in forming tires comprising a strip of tire-making material of such length as to complete a predetermined portion of a tire, and an auxiliary member or leader attached to the forward end thereof for joining it to the core or tire-forming device.

13. A flexible band for use in forming tires comprising a strip of tire-making material of such length as to complete a predetermined portion of a tire, and an auxiliary member or follower attached to the rear end thereof.

JOHN R. GAMMETER.

Witnesses:
R. M. PIERSON,
WALTER K. MEANS.